Oct. 8, 1940.   W. R. MILLER   2,216,825
BUILDING TEMPERATURE CONTROL SYSTEM
Filed Sept. 16, 1936
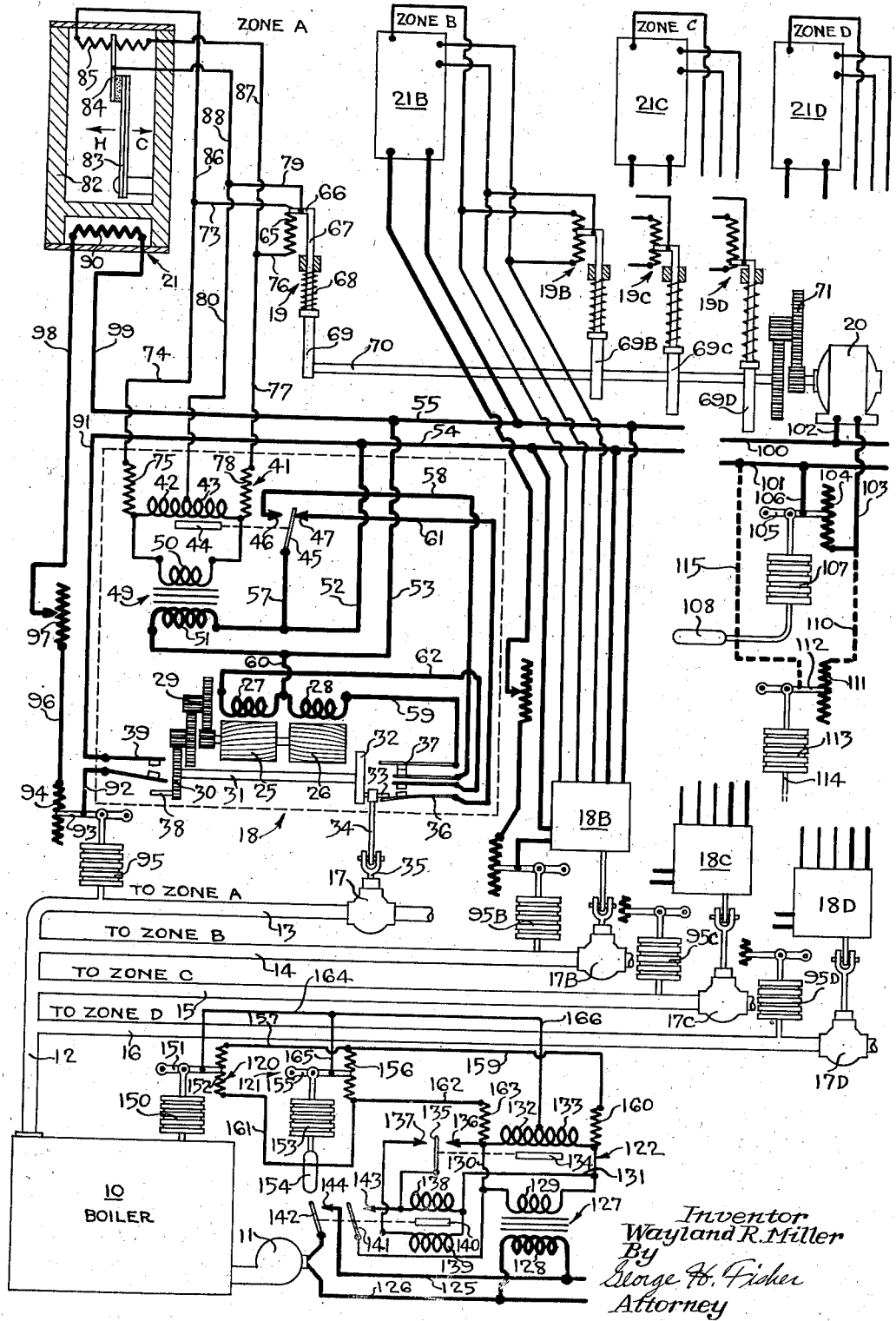
Inventor
Wayland R. Miller
By George H. Fisher
Attorney Patented Oct. 8, 1940

2,216,825

UNITED STATES PATENT OFFICE 2,216,825

BUILDING TEMPERATURE CONTROL SYSTEM

Wayland R. Miller, Nashotah, Wis., assignor to Minneapolis-Honeywell Regulator Company, Minneapolis, Minn., a corporation of Delaware Application September 16, 1936, Serial No. 101,108

20 Claims. (Cl. 236—46)

This invention relates to temperature control systems for buildings and finds particular utility when applied to a building which is provided with zones for maintaining the desired temperature throughout the building.

An object of this invention is to provide a temperature control system for a building having a plurality of zones and means for conducting conditioning fluid to each of the zones with time operated means for controlling the supply of conditioning fluid to the various zones in a predetermined sequence and temperature responsive means for each zone for increasing or decreasing the time during which conditioning fluid is delivered to that particular zone.

It is another object of this invention to make the temperature responsive means of the variable resistance type and the time operated means of a variable resistance type the two variable resistances operating a common relay for controlling the admission of conditioning fluid to the various zones.

It is still a further object of this invention to provide a means for adjusting the time operated means whereby the sequence of operation of the system may also be varied.

Still another object of this invention is to provide a means for varying the condition of the conditioning fluid and a means responsive to the condition of the conditioning fluid for adjusting the time operated means to vary the sequence of operation.

The mode of operation, the construction of the various elements, and the combination of these elements into a complete system also afford objects of this invention.

Other objects and advantages will become apparent to those skilled in the art upon reference to the accompanying specification, claims and drawing.

For a more thorough understanding of this invention, reference is made to the accompanying single sheet of drawings in which is diagrammatically disclosed the control system of the instant invention.

A boiler for supplying conditioning fluid for the building is generally designated at 10 and this boiler may be fired by an oil burner 11 although any other suitable firing means may be utilized. For purposes of illustration, it is assumed that the boiler 10 is a steam boiler. Steam is taken from the boiler through a header 12 and delivered to zone pipes 13, 14, 15, and 16. It is assumed that the building is divided into four zones, which may be designated zones A, B, C, and D, respectively. The zone pipe 13 leads to the radiators or heat exhangers (not shown), in zone A, zone pipe 14 leads to the radiators in zone B and the zone pipes 15 and 16 lead to the radiators in zones C and D, respectively.

Each zone pipe is provided with a control valve 17 for controlling the supply of conditioning fluid to that zone, the control valve 17 for zones B, C, and D being designated 17B, 17C, and 17D, respectively.

Each valve 17 may be controlled by a reversible motor generally designated at 18. Each reversible motor 18 may be controlled by a time operated device generally designated at 19, these time operated devices being preferably of the variable resistance type. The reversible motors 18 may be also controlled by temperature responsive controllers generally designated at 21. The various valves 17, motors 18, time operated devices 19, and temperature responsive controllers 21 are designated by the characters B, C, and D to denote which zones these devices are associated with.

Referring now to the left-hand portion of the drawing concerning zone A, the motor 18 is shown to comprise rotors 25 and 26 controlled by field windings 27 and 28, respectively. The rotors 25 and 26 are connected through a gear train 29 to a gear 30 mounted on a shaft 31. The shaft 31 carries a crank disc 32 having a crank pin 33. A pitman 34 connects the crank pin 33 to the valve stem 35 of the valve 17. The crank pin 33 may also operate limit switches 36 and 37 to prevent over-travel of the motor in either direction. The gear 30 mounted on the shaft 31 may also carrying a pin 38 which is adapted to operate an auxiliary switch 39.

Motor 18 also includes a balanced relay generally designated at 41 which may comprise series connected coils 42 and 43 for controlling the operation of an armature 44 which is connected in any suitable manner to a switch arm 45. Switch arm 45 is adapted to engage either contact 46 or 47. The arrangement is such that when the relay coil 42 is energized more than relay coil 43, the switch arm 45 is moved into engagement with the contact 46 and when the relay coil 43 is energized more than the relay coil 42, switch arm 45 is moved into engagement with the contact 47. Power is supplied to the relay 41 by means of a step-down transformer 49 having a secondary 50 and a primary 51, primary 51, being connected by wires 52 and 53 across line wires 54 and 55 leading from some source of power (not shown).

When the relay coil 42 is energized more than the relay coil 43 so as to move the switch arm 45 into engagement with the contact 46, a circuit is completed from the line wire 54, through wires 52 and 57, switch arm 45, contact 46, wire 58, limit switch 37, wire 59, field winding 28 and wires 60 and 53 back to the other line wire 55. Completion of this circuit causes energization of the field winding 28 to move the valve 17 to an open position. When the valve 17 has been moved to the open position, the limit switch 37 is opened to break the above described circuit to stop the valve 17 in its open position. Also, when the valve 17 is moved to the open position, the pin 38 closes the auxiliary switch 39. When the relay coil 43 becomes energized more than the relay coil 42 so as to move the switch arm 45 into engagement with the contact 47, a circuit is completed from the line wire 54 through wires 52 and 57, switch arm 45, contact 47, wire 61, limit switch 36, wire 62, field winding 27, and wires 60 and 53 back to the other line wire 55. Completion of this circuit causes energization of the field winding 27 to move the valve 17 to a closed position and when the valve 17 is moved to the closed position, the limit switch 36 is opened to maintain the valve 17 in the closed position. Also, when the valve 17 is closed, the auxiliary switch 39 is open. The motors 18B, 18C, and 18D are identical to motor 18 and therefore a further description thereof is not considered necessary.

The time operated device 19 may comprise a potentiometer coil 65 and a slider 66 carried by a plunger 67 which is urged by means of spring 68 into engagement with a cam 69 carried by a shaft 70. The shaft 70 is operated through a reduction gear train 71 by a timing motor 20. Therefore, as the shaft 70 rotates, the slider 66 moves downwardly across the coil 65 and then upwardly to the position shown in the drawing. The slider 66 is, therefore, caused to completely sweep across the potentiometer coil 65 in each direction for one revolution of the shaft 70. For purposes of illustration, it is assumed that the shaft 70 makes one revolution each thirty minutes. The time operated devices 19B, 19C, and 19D for the other three zones are operated by cams 69B, 69C, and 69D also mounted on the shaft 70. However, the various cams 69 are spaced angularly with respect to each other so that each of the sliders 66 assume different positions with respect to their potentiometer coils 65. The purpose of this will be pointed out more fully hereinafter.

The upper end of the potentiometer coil 65 is connected by wires 73 and 74 and a protective resistance 75 to the outer end of the relay coil 42. In a like manner, the lower end of the potentiometer coil 65 is connected by wires 76 and 77 and a protective resistance 78 to the outer end of the relay coil 43. The slider 66 is connected by wires 79 and 80 to the junction of the two relay coils 42 and 43. The outer ends of the relay coils 42 and 43 are connected across the secondary 50 of the step-down transformer 49.

The temperature responsive device for each zone, generally designated at 21 for purposes of illustration, is shown to be an outdoor controller which may be located outside of the building adjacent the zone which it is to control. This outdoor controller may comprise a metallic mass 82 which is hollowed out to receive a bimetallic element 83. The bimetallic element 83 is adapted to operate a slider 84 with respect to a potentiometer coil 85. The bimetallic element 83 responds directly to the temperature of the mass 82 and since the mass 82 is at times heated by a heater 90 in a manner to be pointed out more fully hereafter, the thermostatic element 83 is not only affected by outdoor temperatures but is also affected by wind velocity and solar radiation.

The left-hand end of the potentiometer coil 85 is connected by a wire 86 to the junction of wires 73 and 74 and likewise the right-hand end thereof is connected by a wire 87 to the junction of wires 76 and 77. The slider 84 is connected by a wire 88 to the junction of wires 79 and 80. From the above wiring connections, it is seen that the potentiometer coils 85 and 68 are connected in parallel with the series connected coils 42 and 43 and across the secondary 50. Likewise, it is seen that the sliders 84 and 66 are both connected together and to the junction of the series connected coils 42 and 43.

Assume that the slider 84 of the controller 21 is in the mid position and since the slider 66 is at the upper end of the potentiometer coil 65, the relay coil 42 is substantially short-circuited, whereby the energization thereof is less than the energization of the relay coil 43. As pointed out above, when this condition occurs within the relay coils 42 and 43, the valve 17 is in a closed posititon. Since the timing motor 20 is in continuous operation, the slider 66 moves downwardly with respect to the potentiometer coil 65 and when the slider 66 has moved to a position just below the mid point of the potentiometer coil 65, the relay coil 42 becomes energized more than the relay coil 43. As a result of this unequal energizations of the relay coil, the switch arm 45 is moved into engagement with the contact 46 to move the valve 17 to an open position. Continued movement of the slider 66 downwardly still maintains the valve 17 closed and the valve will remain closed until such time as the slider 66 moves upwardly to a point slightly above the mid-point of the potentiometer coil 65 whereupon the relay coil 43 becomes more highly energized than the relay coil 42 and the valve 17 is moved to a closed position. From the above it is seen that when the slider 84 of the temperature responsive device 21 is in a mid position, the valve 17 is held in a closed position whenever the slider 66 of the time operated device 19 is above the mid point of the potentiometer coil 65 and the valve 17 is maintained in an open position whenever the slider 66 is below the mid point of the potentiometer coil 65 of the time operated device. With the shaft 70 rotating at a rate corresponding to one revolution every thirty minutes, it is seen that the valve 17 is held open for fifteen minutes and is held closed for fifteen minutes.

Assume that the temperature of the block 82 of the controller 21 decreases so as to move the slider 84 to the right in the direction indicated by the arrow designated C. This movement of the slider 84 decreases the energization of the coil 43 and increases the energization of the coil 42 and, therefore, the coil 42 may become more highly energized than the coil 43 before the slider 66 moves down to the mid position of the potentiometer coil 65. It follows then that when the slider 84 is to the right of the position shown in the drawing, the valve 17 is opened earlier and closed later than if the slider 84 were in the mid position. Conversely, if the slider 84 is moved to the left in a direction indicated by the arrow designated H as a result of an increase in the temperature of the block 82, the energization of the relay coil 42 is decreased and the energization of the relay coil 43 is increased. This means that the slider 66 must move downwardly beyond the mid point of the potentiometer coil 65 to cause the relay coil 42 to become more highly energized than the relay coil 43 to open the valve 17. Therefore, with the slider 84 of the controller 21 in a position to the left of that shown in the drawing, the valve 17 will be turned on later and turned off earlier than if the slider 84 were in a mid position.

As pointed out above, the auxiliary switch 39 is closed whenever the valve 17 is open and closure of this switch completes a circuit from the line wire 54 through wire 91, auxiliary switch 39, wire 92, slider 93 engaging with a resistance 94, the slider 93 being operated by a pressure bellows 95, wire 96, variable resistance 97, wire 98, heater 90, and wire 99 back to the other line wire 55. Therefore, when the auxiliary switch 39 is closed, heat is supplied to the outdoor controller 21. The variable resistance 97 is so adjusted that the heat input to the outdoor controller 21 is proportional to the heat input in that zone of the building as the heat loss of the outdoor controller corresponds to the heat loss of that zone. By maintaining this proportional relationship between the heat inputs and the heat losses, the temperature of that zone of the building may be maintained at the desired value in a manner more particularly pointed out in United States Patent 2,065,835 granted to Daniel G. Taylor on December 29, 1936.

From the above, it is seen that conditioning fluid is delivered to zone A in a definite time cycle and the length of time which the conditioning fluid is delivered to the zone is determined by the outdoor controller 21. Since the outdoor controller 21 also controls the length of time which heat is supplied to the outdoor controller and since the heating effect of the heater 90 is adjusted in accordance with the heat inputs and heat outputs of the controller and the zone, the desired temperature is maintained within that zone. Although for purposes of illustration I have shown the controller 21 to be of the outdoor type, it may take the form of a room temperature responsive device in which case the bimetallic element 83 would respond to room temperature and the mass 82, the heater 90 and the auxiliary switch 39 would be omitted. Substantially the same results would be obtained by the room controller except that corrections for wind velocity and solar radiation would not be readily obtained.

Each of the control devices for zones B, C, and D operate exactly the same as those of zone A and, therefore, a complete description of these zone control devices is not considered necessary. However, as pointed out above, the cams 69A, 69B, 69C, and 69D are spaced angularly about shaft 70 so that the valves 17 of the various zones will open at different times. By reason of this construction, the valves of two or more zones are not opened simultaneously and therefore extreme loads or demands on the boiler 10 are not made. In other words, the times of opening of the various zone valves are spaced apart to prevent fluctuating loads on the boiler 10 and the length of time which each of these valves is opened is controlled by the heating load of that particular zone.

Power is supplied to the timing motor 20 by means of line wires 100 and 101. It is found to be advisable to increase the number of cycles of operation of the valve 17 as the outdoor temperature decreases. This may be accomplished in various ways by providing interchangeable reduction gear trains having different gear ratios that may be substituted in accordance with changing outdoor temperatures or by providing a variable transmission between the motor 20 and the shaft 70. The speed of the motor 20 may be controlled directly by outdoor temperatures for accomplishing these results, and if such mode of operation is utilized power may be supplied to the timing motor 20 by a wire 102 leading from the line wire 100 to the motor 20 and the motor 20 being connected by a wire 103 to a resistance 104 which is contacted by a slider 105 connected by a wire 106 to the other line wire 101. The slider 105 may be operated by a bellows 107 connected to a bulb 108 containing a volatile fluid which may be located outside of the building and effected by outdoor temperatures. The arrangement is such that as the outdoor temperature increases the slider 105 is moved upwardly to increase the resistance in control of the timing motor 20 to slow down the speed of operation of the timing motor 20. In this manner, the sequence of operation is slowed down as the outdoor temperature increases and is speeded up as the outdoor temperature decreases.

It is found also that during severe weather conditions the engineer in charge of the heating plant of a building increases the steam pressure delivered to the radiators of the building and he usually does this in pretty close accord with variations in outdoor temperature. Therefore, the timing motor 20 may be controlled by changes in the steam pressure of the heating system so that the timing motor would be speeded up as the outdoor temperature decreases. This may be accomplished by a pressure controller having a bellows 113 connected by a pipe 114 to the boiler 10, the bellows operating a slider 112 with respect to a resistance 111, the resistance 111 being connected by a wire 110 to the motor 20 and the slider 112 being connected by a wire 115 to the line wire 101. As the steam pressure increases, the resistance 111 is decreased to speed up the operation of the timing motor 20.

If it be desired to make the system completely automatic and not dependent upon the adjustment of the steam pressure by the engineer in charge of the heating system, the oil burner 11 may be controlled by a pressure controller, generally designated at 120, and an outdoor temperature compensator, generally designated at 121, and in this manner the boiler pressure may be made to increase as the outdoor temperature decreases. The pressure controller 120 and the temperature compensator 121 may control the operation of a relay, generally designated at 122, which in turn controls the operation of the oil burner 11. Power is supplied to the oil burner 11 by line wires 125 and 126 leading from some source of power (not shown) and power may be supplied to the relay 122 by means of a stepdown transformer 127 having a primary 128 connected across the line wires 125 and 126 and a secondary 129. Secondary 129 may be connected by wires 130 and 131 to the outer ends of series connected coils 132 and 133 which control the operation of an armature 134. The armature 134 may operate in any suitable manner a switch arm 135 with respect to contacts 136 and 137. The switch arm 135 cooperating with the contacts 136 and 137 may control an energizing coil 138 and a bucking coil 139, which two coils control the operation of an armature 140. The armature 140 may operate switch arms 141 and 142 with respect to contacts 143 and 144.

The pressure controller 120 may comprise a bellows 150 responsive to boiler pressure for operating a slider 151 with respect to a potentiometer coil 152. The outdoor temperature compensator may comprise a bellows 153 connected to a bulb 154 containing a volatile fluid and located outside of the building so as to respond to outdoor temperatures. The bellows 153 may operate a slider 155 with respect to a potentiometer coil 156. The upper end of the potentiometer coil 152 and the upper end of the potentiometer coil 156 are connected by wires 157 and 159 and a protective resistance 160 to the outer end of the relay coil 133. Likewise, the lower end of the potentiometer coil 152 and the lower end of the potentiometer coil 156 may be connected by wires 161 and 162 and protective resistance 163 to the outer end of the relay coil 132. The sliders 151 and 155 may be connected together and to the junction of the coils 132 and 133 by wires 164, 165, and 166.

With the parts in the position shown in the drawing, the sliders 151 and 155 are in the mid position and the coils 132 and 133 are equally energized. If the slider 151 is moved downwardly in response to a decrease in outdoor temperature, the relay coil 133 becomes more highly energized than the relay coil 132 to cause movement of the switch arm 135 into engagement with the contact 136. Movement of the switch arm 135 into engagement with the contact 136 completes a circuit from the secondary 129 through wire 130, contact 136, switch arm 135, relay coil 138, and wire 131 back to the secondary 127. Completion of this circuit causes energization of the energizing coil 138 to move the switch arms 141 and 142 into engagement with the contacts 143 and 144, respectively. Movement of switch arm 141 into engagement with the contact 143 completes a maintaining circuit from the secondary 129 through switch arm 141, contact 143, energizing coil 138, and wire 131 back to the secondary 129. This maintaining circuit maintains the energizing coil 138 energized even though the switch arm 135 should move out of engagement with contact 136. Movement of the switch arm 142 into engagement with the contact 144 causes operation of the oil burner 11 to increase the boiler pressure. An increase in boiler pressure moves the slider 151 upwardly and when the boiler pressure has increased to a value determined by the outdoor temperature so as to cause the relay coil 132 to become more highly energized than the relay coil 133, the switch arm 135 is moved into engagement with the contact 137 to complete a circuit from the secondary 127 through switch arm 141, contact 143, switch arm 135, contact 137, bucking coil 139, and wire 131 back to the secondary 127. Completion of this circuit energizes the bucking coil 139 which neutralizes the action of the energizing coil 138 and permits switch arms 141 and 142 to move out of engagement with the contacts 143 and 144, this latter movement of the switch arms 141 and 142 being accomplished by means of springs, gravity, or other means (not shown).

By reason of this compensated control circuit in control of the oil burner 11, the boiler pressure is adjusted to and maintained at predetermined values in accordance with outdoor temperatures. Since the speed of the timing motor 20 may be controlled in accordance with boiler pressures, the timing sequence is therefore controlled in accordance with outdoor temperature.

If the temperature responsive device 21 is of the outdoor controller type illustrated in the drawing, means must be provided for varying the heat supplied to the outdoor controller as the heat supplied to the particular zone is varied in order to maintain the proportional relationship between the heat inputs and the heat outputs which is necessary for the satisfactory maintenance of even temperatures within the building. This is accomplished by the resistance 94 and the slider 93 being operated in response to steam pressure. The arrangement is such that as the pressure of the steam delivered to the zone is increased and consequently the heat to the zone is increased, the resistance 94 in series with the heater 90 of the outdoor controller 21 is decreased to increase the supply of heat to the outdoor controller to maintain the proper proportional relationship.

Various forms of this invention may become apparent to those skilled in the art and consequently this invention is to be limited only by the scope of the appended claims and prior art.

I claim as my invention:

1. In a temperature control system for a building having a plurality of zones and means for conducting conditioning fluid to each of the zones, the combination of valve means for each zone for controlling the flow of conditioning fluid to its zone, a motor in control of each valve means, a relay in control of each motor, variable resistance temperature responsive means in control of each relay, a second variable resistance means also in control of each relay, and time operated means for operating all of said last mentioned variable resistance means in sequence for sequentially opening and closing said valve means, the length of time of opening of each valve means being controlled by its associated temperature responsive variable resistance means.

2. In a temperature control system for a building having a plurality of zones and means for conducting conditioning fluid to each of the zones, the combination of valve means for each zone for controlling the flow of conditioning fluid to its zone, a motor in control of each valve means, a relay in control of each motor, variable resistance temperature responsive means in control of each relay, a second variable resistance means also in control of each relay, time operated means for operating all of said last mentioned variable resistance means in sequence for sequentially opening and closing said valve means, the length of time of opening of each valve means being controlled by its associated temperature responsive variable resistance means, and means for adjusting the time operated means to vary the frequency of operation.

3. In a temperature control system for a building having a plurality of zones and means for conducting conditioning fluid to each of the zones, the combination of valve means for each zone for controlling the flow of conditioning fluid to its zone, a motor in control of each valve means, a relay in control of each motor, variable resistance temperature responsive means in control of each relay, a second variable resistance means also in control of each relay, time operated means for operating all of said last mentioned variable resistance means in sequence for sequentially opening and closing said valve means, the length of time of opening of each valve means being controlled by its associated temperature responsive variable resistance means, and means responsive to outdoor temperatures for adjusting the time operated means to vary the frequency of operation.

4. In a temperature control system for a building having a plurality of zones and means for conducting conditioning fluid to each of the zones, the combination of valve means for each zone for controlling the flow of conditioning fluid to its zone, a motor in control of each valve means, a relay in control of each motor, variable resistance temperature responsive means in control of each relay, a second variable resistance means also in control of each relay, time operated means for operating all of said last mentioned variable resistance means in sequence for sequentially opening and closing said valve means, the length of time of opening of each valve means being controlled by its associated temperature responsive variable resistance means, means for varying the condition of the conditioning fluid, and means responsive to the condition of the conditioning fluid for adjusting the time operated means to vary the frequency of operation.

5. In a temperature control system for a building having a plurality of zones and means for conducting conditioning fluid to each of the zones, the combination of means for each zone for controlling the flow of conditioning fluid to its zone, time operated means for controlling all of said flow controlling means in sequence for sequentially supplying conditioning fluid to each zone, temperature responsive means for each zone for also controlling the flow controlling means of that zone to increase or decrease the time during which conditioning fluid is delivered to its zone, and means for adjusting the time operated means to vary the frequency of operation.

6. In a temperature control system for a building having a plurality of zones and means for conducting conditioning fluid to each of the zones, the combination of means for each zone for controlling the flow of conditioning fluid to its zone, time operated means for controlling all of said flow controlling means in sequence for sequentially supplying conditioning fluid to each zone, temperature responsive means for each zone for also controlling the flow controlling means of that zone to increase or decrease the time during which conditioning fluid is delivered to its zone, and means responsive to outdoor temperatures for adjusting the time operated means to vary the frequency of operation.

7. In a temperature control system for a building having a plurality of zones and means for conducting conditioning fluid to each of the zones, the combination of means for each zone for controlling the flow of conditioning fluid to its zone, time operated means for controlling all of said flow controlling means in sequence for sequentially supplying conditioning fluid to each zone, temperature responsive means for each zone for also controlling the flow controlling means of that zone to increase or decrease the time during which conditioning fluid is delivered to its zone, means for varying the condition of the conditioning fluid, and means responsive to the condition of the conditioning fluid for adjusting the time operated means to vary the frequency of operation.

8. In a temperature control system for a building having a plurality of zones and means for conducting conditioning fluid to each of the zones, the combination of means for each zone for controlling the flow of conditioning fluid to its zone, an outdoor controller associated with each zone having thermostatic means and temperature changing means, time operated means for controlling all of said flow controlling means and the temperature changing means of all of the outdoor controllers in sequence for sequentially supplying conditioning fluid to each zone and for sequentially controlling each temperature changing means, said thermostatic means of each controller also controlling the flow controlling means and the temperature changing means of the outdoor controller of that zone to increase or decrease the time during which conditioning fluid is delivered to its zone and the time during which the temperature changing means is operated.

9. In a temperature control system for a building having a plurality of zones and means for conducting conditioning fluid to each of the zones, the combination of means for each zone for controlling the flow of conditioning fluid to its zone, an outdoor controller associated with each zone having thermostatic means and temperature changing means, time operated means for controlling all of said flow controlling means and the temperature changing means of all of the outdoor controllers in sequence for sequentially supplying conditioning fluid to each zone and for sequentially controlling each temperature changing means, said thermostatic means of each controller also controlling the flow controlling means and the temperature changing means of the outdoor controller of that zone to increase or decrease the time during which conditioning fluid is delivered to its zone and the time during which the temperature changing means is operated and means for adjusting the time operated means to vary the frequency of operation.

10. In a temperature control system for a building having a plurality of zones and means for conducting conditioning fluid to each of the zones, the combination of means for each zone for controlling the flow of conditioning fluid to its zone, an outdoor controller associated with each zone having thermostatic means and temperature changing means, time operated means for controlling all of said flow controlling means and the temperature changing means of all of the outdoor controllers in sequence for sequentially supplying conditioning fluid to each zone and for sequentially controlling each temperature changing means, said thermostatic means of each controller also controlling the flow controlling means and the temperature changing means of the outdoor controller of that zone to increase or decrease the time during which conditioning fluid is delivered to its zone and the time during which the temperature changing means is operated, and means for varying the condition of the conditioning fluid and the temperature changing effect of the temperature changing means.

11. In a temperature control system for a building having a plurality of zones and means for conducting conditioning fluid to each of the zones, the combination of means for each zone for controlling the flow of conditioning fluid to its zone, an outdoor controller associated with each zone having thermostatic means and temperature changing means, time operated means for controlling all of said flow controlling means and the temperature changing means of all of the outdoor controllers in sequence for sequentially supplying conditioning fluid to each zone and for sequentially controlling each temperature changing means, said thermostatic means of each controller also controlling the flow controlling means and the temperature changing means of the outdoor controller of that zone to increase or decrease the time during which conditioning fluid is delivered to its zone and the time during which the temperature changing means is operated, means for varying the condition of the conditioning fluid and the temperature changing effect of the temperature changing means, and means responsive to the condition of the conditioning fluid for adjusting the time operated means to vary the frequency of operation.

12. In a temperature control system for a building, the combination of heating means for the building, a relay in control of the heating means, an outdoor controller having heating means and temperature responsive variable resistance means, said relay also being in control of said outdoor controller heating means, and time operated variable resistance means connected to said relay for turning on and off both heating means, said temperature responsive variable resistance means also being connected to said relay for varying the time that both heating means are turned on.

13. In a temperature control system for a space having means for conducting conditioning fluid to the space, valve means in control of the flow of conditioning fluid to the space, time operated means for periodically operating said valve means in a predetermined sequence of operation, means for varying the condition of the conditioning fluid, and means responsive to the condition of the conditioning fluid for adjusting the time operated means to vary the frequency of operation of said valve means.

14. In a temperature control system for an enclosure having means for conducting conditioning fluid thereto, valve means for controlling the supply of conditioning fluid to the enclosure, a controller outside of the enclosure and including temperature changing means and thermostatic means, means controlled by said thermostatic means for controlling said valve means, and means responsive to the condition of the conditioning fluid controlling the temperature changing effect of the controller temperature changing means.

15. In a temperature control system for an enclosure having means for conducting conditioning fluid thereto, valve means for controlling the supply of conditioning fluid to the enclosure, a controller outside of the enclosure and including temperature changing means and thermostatic means, means controlled by said thermostatic means for controlling said valve means, means for varying the condition of the conditioning fluid, and means responsive to the condition of the conditioning fluid for varying the temperature changing effect of the controller temperature changing means.

16. In a temperature control system for a building having a plurality of zones and means for conducting conditioning fluid to each of the zones, the combination of, means for each zone for controlling the flow of conditioning fluid to its zone, temperature responsive means for each zone for controlling the flow controlling means of that zone to deliver conditioning fluid to that zone upon a call for temperature change, and time operated means operatively associated with all of said temperature responsive means and flow controlling means to stagger the periods of delivery of conditioning fluid to the various zones.

17. In a temperature control system for a building having a plurality of zones and means for conducting conditioning fluid to each of the zones, the combination of, means for each zone for controlling the flow of conditioning fluid to its zone, an outdoor controller associated with each zone and having thermostatic means and temperature changing means, means controlled by said thermostatic means for controlling the temperature changing means and the flow controlling means to deliver conditioning fluid to that zone upon a call for temperature change to maintain desired temperatures therein, and time operated means operatively associated with all of said outdoor controllers and flow controlling means to stagger the periods of delivery of conditioning fluid to the various zones.

18. In a temperature control system for a building having a plurality of zones and means for conducting conditioning fluid to each of the zones, the combination of, means for each zone for controlling the flow of conditioning fluid to its zone in a manner to either check or release the flow of conditioning fluid thereto, temperature responsive means for each zone for controlling the flow controlling means of that zone in a manner to vary the relative lengths of the periods in which the flow of conditioning fluid is checked and the periods in which the flow of conditioning fluid is released, and time operated means associated with all of said temperature responsive means and flow controlling means to stagger the periods in which the flow of conditioning fluid is released to the various zones.

19. In a temperature control system for a building having a plurality of zones and means for conducting conditioning fluid to each of the zones, the combination of a valve for each zone for controlling the flow of conditioning fluid to its zone, a motor for operating each valve, temperature responsive means for each zone connected to the valve motor of that zone for controlling the valve motor in a manner to open and close the valve for periods the relative lengths of which vary in accordance with the demand for heat, and time operated means associated with said valve motors for preventing movement of one valve in one direction until a timed period following movement of another valve in the same direction.

20. In a temperature control system for a building having a plurality of zones and means for conducting conditioning fluid to each of the zones, the combination of a valve for each zone for controlling the flow of conditioning fluid to its zone, a motor for operating each valve, temperature responsive means for each zone connected to the valve motor of that zone for controlling the valve motor in a manner to open and close the valve for periods the relative lengths of which vary in accordance with the demand for heat, and means associated with said valve motors for preventing movement of one valve in one direction until a period of time following movement of another valve in the same direction.

WAYLAND R. MILLER.